Figure 1:
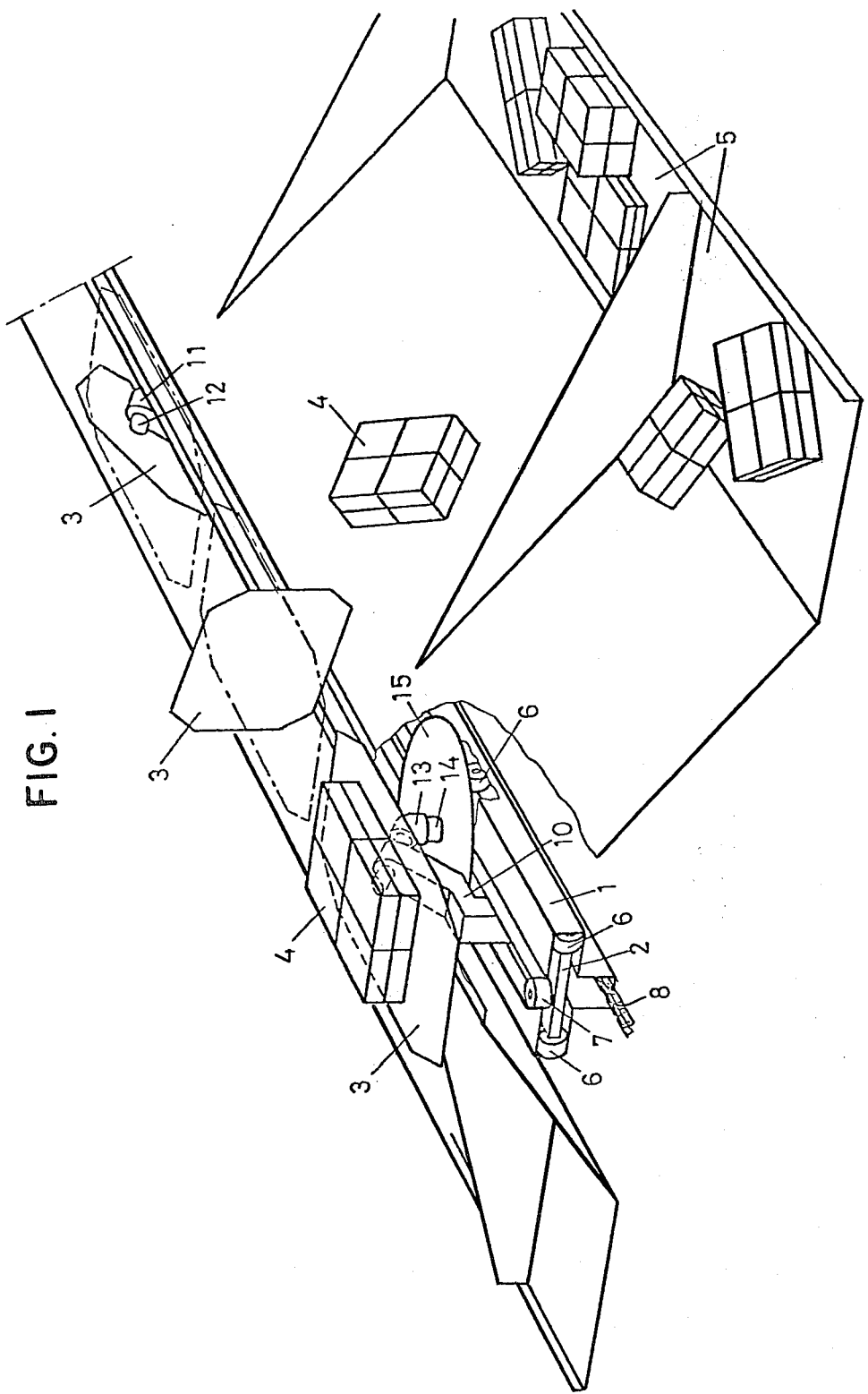

United States Patent [19]

Bollier

[11] 4,413,721
[45] Nov. 8, 1983

[54] SORTING CONVEYOR FOR INDIVIDUAL OBJECTS

[75] Inventor: Willy Bollier, Goldau, Switzerland
[73] Assignee: Daverio A.G., Zurich, Switzerland
[21] Appl. No.: 287,742
[22] PCT Filed: Nov. 17, 1980
[86] PCT No.: PCT/CH80/00140
    § 371 Date: Jul. 31, 1981
    § 102(e) Date: Jul. 31, 1981
[87] PCT Pub. No.: WO81/01999
    PCT Pub. Date: Jul. 23, 1981

[30] Foreign Application Priority Data

Jan. 4, 1980 [CH] Switzerland ............... 38/80

[51] Int. Cl.³ .................................. B65G 47/46
[52] U.S. Cl. ........................ 198/365; 198/802
[58] Field of Search ................. 198/365, 796, 802

[56] References Cited

U.S. PATENT DOCUMENTS 4,004,681 1/1977 Clewett et al. ............... 198/365
4,081,071 3/1978 Nielsen ........................ 198/796
4,139,088 2/1979 Olesen ......................... 198/365

Primary Examiner—Joseph E. Valenza
Assistant Examiner—Jonathan D. Holmes
Attorney, Agent, or Firm—Weiser & Stapler

[57] ABSTRACT

In a guide track (1) there travel a plurality of carts (2) which are driven by an endless chain (8). Each cart (2) carries a load bearing tray (3), which is intended to receive a package or the like. At predetermined discharge locations the load bearing trays are tilted into an inclined position so that the packages slide into a collecting container. To the load bearing tray there is attached a shaft (12) which extends diagonally to the load bearing tray surface, and which is journalled rotatably in a bearing (11). To tilt the load bearing tray (3) the shaft (12) is tilted by a drive disc (15) which is connected to the shaft (12) through a shaft (14) and a universal joint (13). The drive disc (15) itself is braked by means of electromechanical or mechanical guide rails at predetermined discharge locations upon passage of the cart and is thereby rotated. The apparatus for tilting the load bearing trays is very simple and functions largely trouble free.

2 Claims, 6 Drawing Figures

SORTING CONVEYOR FOR INDIVIDUAL OBJECTS

The invention relates to a sorting conveyor for individual objects in accordance with the preamble of patent claim 1.

Sorting conveyors of this type are known and are principally used in post office distribution centers for sorting of packages in accordance with their destinations. For example, from British Pat. No. 1,335,114 a sorting conveyor is known in which the bearing tray is tiltable about a shaft which extends lengthwise of the cart. The tilting movement is triggered by a linkage which is actuated by a separate guide rail which is deflected by switches positioned at the tilt locations. However, the guide rail which is required in addition to the rails for the cart, is relatively expensive and is subject to wearing out. In a sorting conveyor in accordance with British Pat. No. 1,544,570 the load bearing trays require no guidance in the horizontal position because they rest by means of bearing cups upon tilt shafts positioned on both sides of the longitudinal central axis of the cart. However, the triggering of the tilt motion again requires guidance rails, or switches. Moreover, additional springs must be used which maintain the load bearing trays in the horizontal or in the tilted position.

It is an object of the present invention to construct a sorting conveyor of the initially described kind in such a manner that the tilting of the load bearing trays into the desired position at the respective discharge locations requires the least possible structural effort.

This object is achieved in accordance with the invention by an embodiment in accordance with the characterizing portion of patent claim 1.

By tilting of the shaft which extends diagonally to the load bearing tray, there is automatically obtained the desired inclinaton of the tray, which permits the downward sliding of the individual objects into a collecting container. To pivot the shaft there is preferably rotatably attached to the cart a drive disc, whose axle, e.g. by way of a universal joint, is in drive connection with the shaft of the tray. At the discharge locations, there can then be located guide rails which cooperate with the drive disc to rotate the latter.

By virtue of this construction, the mechanism for the tilting of the load bearing trays into the desired position becomes extremely simple and is characterized by a low susceptability to failure.

Figure 2:
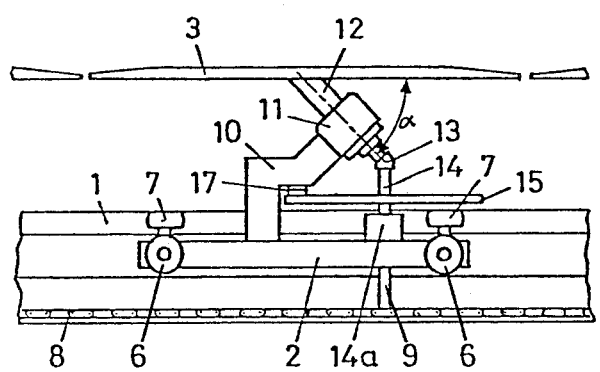
Figure 4:
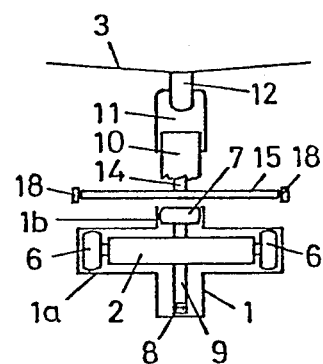
Figure 3:
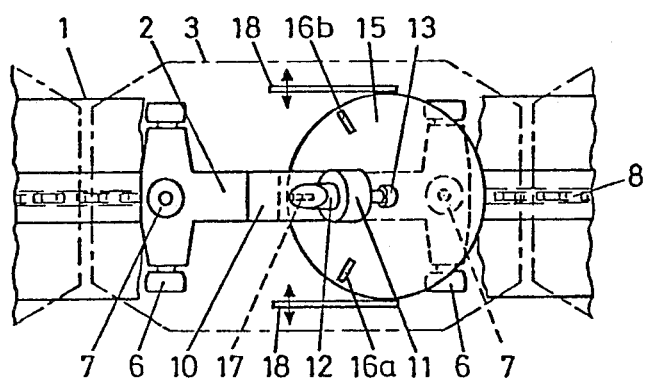
Figure 5:
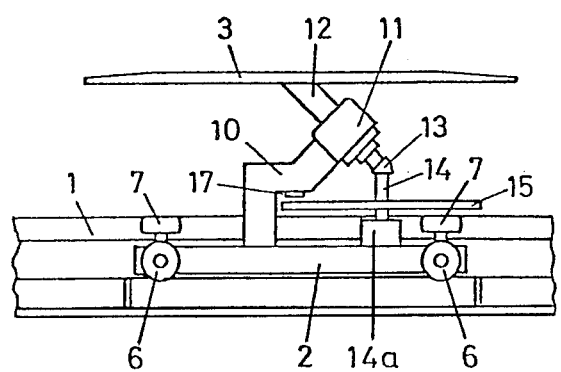
Figure 6:
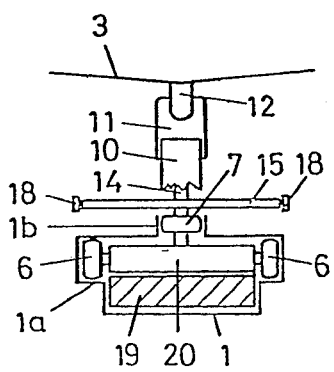

The drawing diagrammatically shows an embodiment of the invention, as well as a varient thereof. There is shown in:

FIG. 1 in perspective view a portion of a conveyor at a discharge location,

FIG. 2 a side view of a cart with chain drive,

FIG. 3 a top view of the cart of FIG. 2,

FIG. 4 a rear view of the cart of FIG. 2,

FIG. 5 a side view of a cart with drive provided by a linear electric motor, and FIG. 6 a rear view of the cart of FIG. 5.

FIG. 1 shows, in perspective representation, a portion of the conveyor path of a sorting conveyor having a guide track 1, within which the carts 2 are propelled. Each cart 2 supports a load bearing tray 3, which is intended to receive a package 4. At two locations, the load bearing trays 3 are shown tilted so that the transported packages 4 are discharged into collection stations 5.

FIGS. 2 through 4 show the construction of a cart 2 with load bearing tray 3. The cart 2 has four support rollers 6, by means of which it rolls within a level guide path 1a of track 1. Horizontal guidance is provided by two guidance rollers 7, which are supported on vertical shafts and are guided by vertical walls 1b of track 1. The drive for carts 2 is provided in known manner by an endless, circulating chain 8 to which each cart 2 is coupled by a follower 9. Each cart 2 has an arm 10 which extends upwardly from the guide track and which provides a support head 11 for a shaft 12 which extends at an angle α inclined to the horizontal load bearing tray 3 and is rigidly connected with the latter. The angle α suitably has a value from about 40° to about 50°. The lower end of shaft 12 is connected through a universal joint 13 with a vertical shaft 14 which is rotatably supported upon cart 2 in a bearing 14a.

A horizontal drive disc 15 is connected to shaft 14 in a rotatably united manner. When this drive disc 15 is rotated relative to the cart, the load bearing tray 3 is tilted into its inclined position, as shown in FIG. 1. The drive disc 15 has stop projections 16a, 16b which cooperate with a central projection serving as a stop member and which maintains drive disc 15 in its centered position, until it is deflected.

At the discharge locations, brake rods 18 are positioned. These, as indicated by double-headed arrows, are pressed, e.g. electromechanically, against the circumference of drive discs 15 and deflect these up to projections 16a or 16b, so that the load bearing tray 3 is inclined toward the left or the right and discharges the package which it carries. Brake rods 18 can also take the form of electromagnets which electromagnetically brake the drive disc 15. Through additional brake rods the load bearing trays 3 are tilted back into their horizontal position after passing the sorting location.

Whereas, in the embodiment of FIGS. 2 through 4, the drive for cart 2 is provided in known manner by a circulating chain 8, FIGS. 5 and 6 show an embodiment in which the drive for the cart is provided by a linear electric motor. The rotor of a squirrel cage induction motor takes the form of a steel track 19, above which the flat stator 20, which is formed by cart 2, moves longitudinally. The construction of cart 2 is exactly the same as in FIGS. 2 through 4.

The tilting of load bearing trays 3 about their inclined shafts 12 makes possible a substantially simpler structural embodiment of the individual carts 2, as compared with known embodiments of carts in which the load bearing tray is tilted about one or two longitudinal shafts.

I claim:

1. Sorting conveyor for individual objects having a plurality of carts circulating along an endless track, each cart carrying a load bearing tray for the conveyed objects, said tray being tiltable from the horizontal position in both directions into an inclined position at predetermined discharge locations by guidance means arranged along the track, said conveyor being characterized in that each said load bearing tray is supported from below by a support shaft which extends diagonally to the load bearing tray surface, said support shaft being rotatably journalled within a bearing fixedly attached to said cart, in that a drive disc mounted on a vertical shaft is rotatably journalled upon the cart, said vertical shaft being in drive connection with said support shaft of the load bearing tray by means of a universal joint, and in that said guidance means at said discharge locations are so constructed as to be capable of rotating said drive disc, thereby to tilt said load bearing tray.

2. Sorting conveyor according to claim 1, characterized in that said guidance means comprise guide rails positioned along the conveyor track, said guide rails being so constructed as to be able to electromechanically or magnetically brake the drive disc upon passage of the cart on which the drive disc is mounted.

* * * * *